United States Patent

Tetzner

[11] 3,972,534
[45] Aug. 3, 1976

[54] DEVICE FOR CONTINUOUS ADJUSTMENT OF THE STYLUS PRESSURE
[75] Inventor: Joachim Tetzner, Berlin, Germany
[73] Assignee: U.S. Philips Corporation, New York, N.Y.
[22] Filed: May 8, 1975
[21] Appl. No.: 575,579

[30] Foreign Application Priority Data
May 18, 1974 Germany............................ 2424279

[52] U.S. Cl................................................ 274/23 R
[51] Int. Cl.² ........................ G11B 3/22; G11B 3/26
[58] Field of Search ........................... 274/23 R, 1.7

[56] References Cited
UNITED STATES PATENTS
2,819,088  1/1958  Boisselier et al.................. 274/23 R
3,649,031  3/1972  Templin............................ 274/23 R
3,779,563  12/1973 Irisawa............................. 274/23 R Primary Examiner—Richard E. Aegerter
Assistant Examiner—Steven L. Stephan
Attorney, Agent, or Firm—Frank R. Trifari; David R. Treacy

[57] ABSTRACT

A device for the continuous adjustment of the stylus pressure in a record player. Vertical stylus pressure can be corrected by means of a load spring whose tensile force can be adjusted by moving the suspension end at the mounting side. The movable end of the load spring is attached to a carrier, which engages a spiral groove or ridge provided in the inner wall of an adjusting ring which is rotatable on the bearing block of the pick-up arm.

3 Claims, 3 Drawing Figures

DEVICE FOR CONTINUOUS ADJUSTMENT OF THE STYLUS PRESSURE

The invention relates to a device for the continuous adjustment of the vertical stylus pressure in a record player, whose pick-up arm at the end which is remote from the pick-up element is pivotable about a horizontal spindle and whose stylus pressure can be corrected by means of a load spring, whose tensile force is adjustable by transferring its end of attachment at the side of the mounting plate.

Such a device for the continuous adjustment of the stylus pressure is known per se. The tension spring which is attached before the pivot of the pick-up arm in this known device is extended by transferring the point of attachment until the stylus pressure has reached the desired value. A drawback of the known device is that when the spring is adjusted the pick-up arm has to be touched, thus applying a disturbing torque about the axis whose pre-loading is to be affected. The pick-up arm is then not freely movable during adjustment of the spring, and by repeatedly releasing the adjusting device and the pick-up arm it should be checked whether the stylus pressure has reached the desired value after previous adjustment.

It is an object of the invention to provide a device for the continuous adjustment of the vertical stylus pressure in which the pick-up arm need not be touched during adjustment of the spring.

With a device of the above-mentioned type this is achieved in that according to the invention the transferrable suspension end of the load spring is attached to a carrier, which cooperates with a spiral groove or ridge provided at the inner wall of an adjusting ring which is rotatable on the bearing block of the pick-up arm.

By adjusting the ring which is rotatable on the bearing block of the pick-up arm, the lower point of attachment of the spring is moved, so that the tensile force acting on the pick-up arm is varied. By the use of a spiral groove or ridge in the ring, the adjustment is highly sensitive, because the length of the groove is great relative to the adjusting height.

However, an essential and important advantage is that during adjustment of the weight load the pick-up arm is not touched.

According to a further embodiment of the invention the carrier is a slide, which is slidable on the bearing block parallel to the axis of said bearing block and which comprises a stud or a groove respectively, which cooperates with the spiral groove or ridge of the ring. Such a slide can readily be mounted in the bearing block.

The invention will be described in more detail with reference to the embodiment shown in the drawing. In the drawing.

Figure 2:
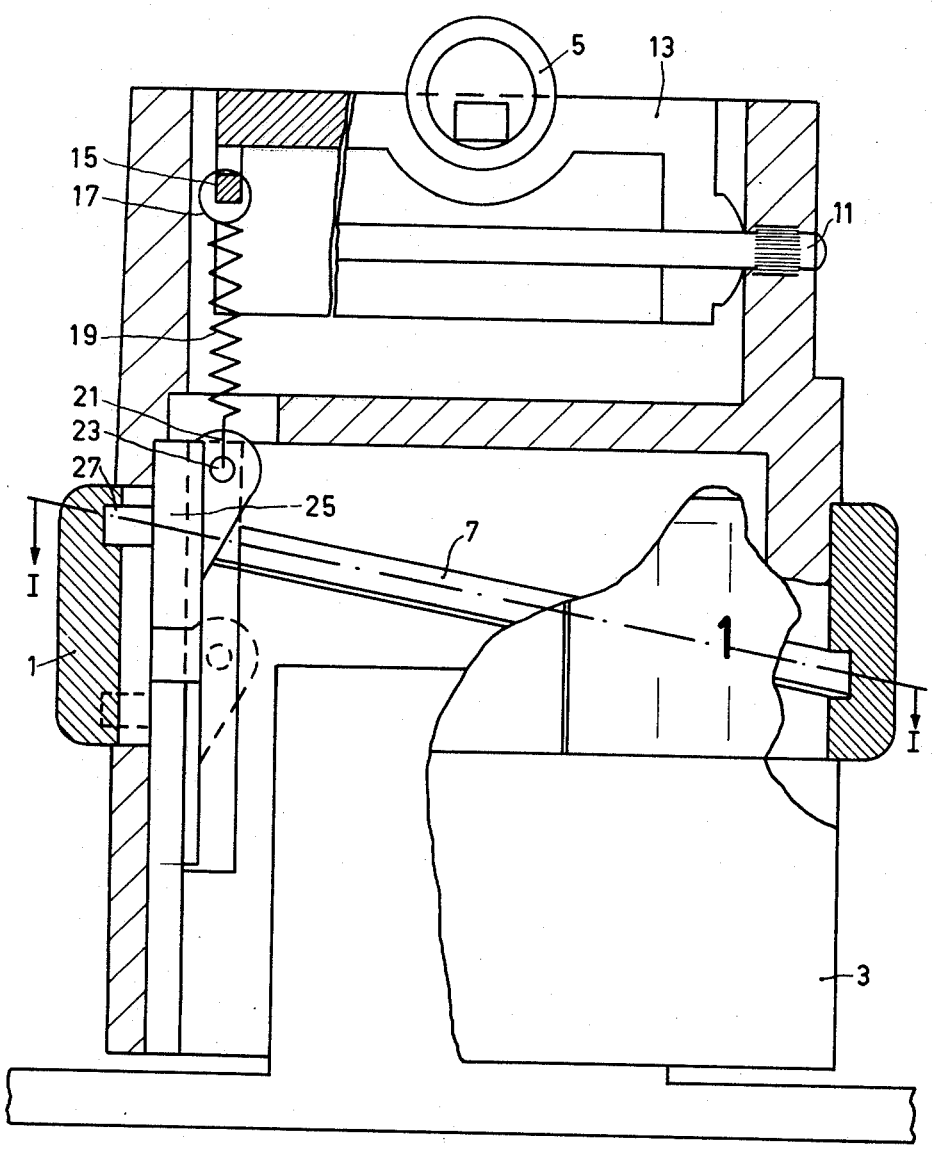
FIG. 2 is an elevation of a bearing block of the pick-up arm with a device according to the invention, partly in cross-section at the line II—II in FIG. 3.

The essential part of the device according to the invention is a split adjusting ring 1. In said adjusting ring 1, which in the mounted condition is journalled on the bearing block 3 (FIG. 2) of a pick-up arm 5 for manual rotation, a spiral groove 7 is formed. Said spiral groove has for example a length of approximately 240 angular degrees, whose pitch can be selected to suit the designer. The ring is provided with a radial space 9, so that it fits the bearing rod 3 in a slightly resilient fashion.

In addition to the ring 1, the pick-up arm 5 is journalled in the bearing block by means of a horizontal spindle 11 and intermediate piece 13.

Figure 1:
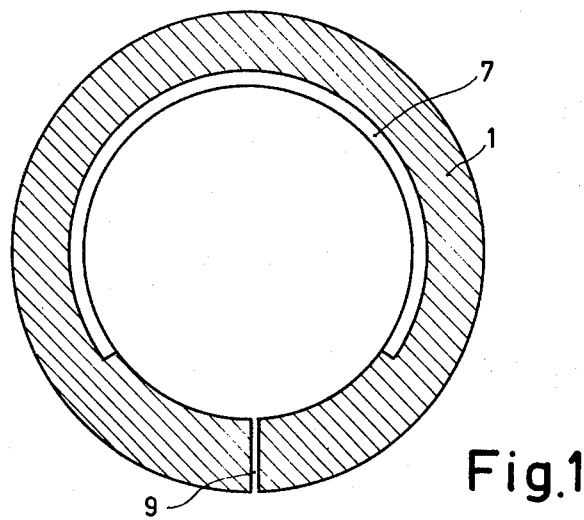
FIG. 1 shows the adjusting ring of the device according to the invention in a sectional view at I—I in FIG. 2 along the spiral groove.

Viewed from the pick-up arm, the intermediate piece 13 is provided with a hook 15 before the spindle 11, in which a lug 17 of a tension load spring 19 can be attached. The other lug 21 of the load spring is attached to a tag 23 of a slide 25. The slide 25 engages the spiral groove 7 with a stud 27. As shown in FIG. 1, the ends of the spiral groove 7 do not extend as far as the ends of the ring 1, so that the stud cannot be disengaged by turning the ring too far.

Figure 3:
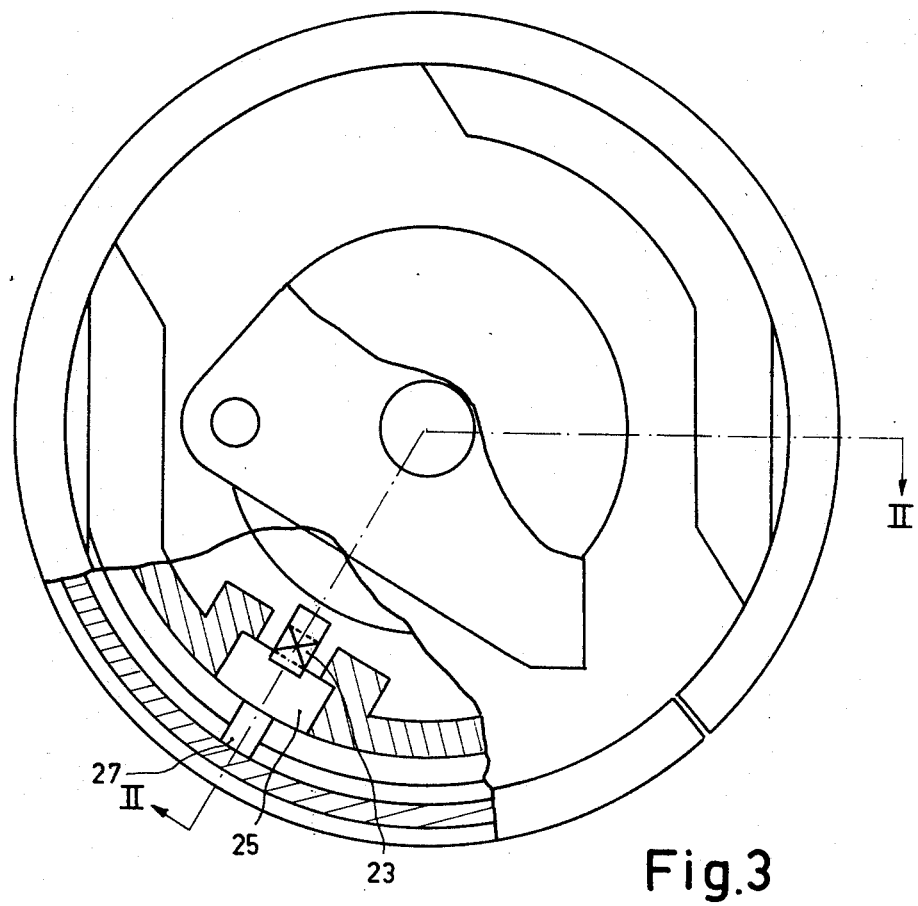
FIG. 3 is a top view of the bearing block of FIG. 2, partly in cross-section with the pick-up arm removed.

As is shown in FIG. 3, the slide 25 is movable parallel to the axis of the bearing block in a guide 27 of the bearing block 3. When the adjusting ring 1 is rotated around the bearing block of the pick-up arm, the slide 25 is vertically moved up and down. Depending on the up and down movements the load spring becomes shorter or longer respectively and the tensile force increases or decreases respectively. Thus, by rotating the ring 1 the load at the rear end of the pick-up arm is increased or reduced, thus enabling the stylus pressure to be adjusted. During the adjustment the pick-up arm is not touched, so that a very sensitive adjustment is possible.

The sensitivity of the adjustment is further increased in that the travel of the slide 25 is relatively short, whilst the rotating path of the adjusting ring is relatively large.

What is claimed is:

1. A device for continuous adjustment of the vertical stylus force in a record player which comprises a bearing block mounted for rotation about a vertical axis, a pick-up arm pivotally journalled in the bearing block about a horizontal axis, and a load spring having two ends and connected at one end to said pick-up arm for adjusting the vertical stylus force, wherein said device comprises an adjusting ring mounted on said bearing block for rotation about a vertical ring axis, said ring having an inner wall; a carrier slidably mounted in said bearing block for movement parallel to said vertical axis, said carrier being connected to the other end of the tension spring; and spiral means for interconnecting said carrier and said ring such that rotation of said ring moves said carrier axially thereby changing force exerted by said load spring, said ring being movable in rotation only about said ring axis while in a mounted condition.

2. A device as claimed in claim 1, wherein said bearing block has an external circumferential groove coaxial with said ring axis and having an inner wall, and said ring is a split ring fitting in said circumferential groove, said ring inner wall engaging said groove inner wall resiliently.

3. A device as claimed in claim 2, wherein said split ring has two ends separated by a space, and said spiral means comprises a spiral groove in said ring inner wall, said groove having ends spaced from the ends of the ring and being less than one revolution in length, and a stud extending from said carrier radially outward with respect to said ring axis and engaging said groove.

* * * * *